(12) United States Patent
Bhella et al.

(10) Patent No.: US 10,938,558 B2
(45) Date of Patent: Mar. 2, 2021

(54) AUTHENTICATION FOR CONNECTING A BARCODE READER TO A CLIENT COMPUTING DEVICE

(71) Applicant: Zebra Technologies Corporation, Lincolnshire, IL (US)

(72) Inventors: Kenneth S. Bhella, Stony Brook, NY (US); Mariya Wright, Cortland Manor, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 92 days.

(21) Appl. No.: 16/221,753

(22) Filed: Dec. 17, 2018

(65) Prior Publication Data
US 2020/0195424 A1    Jun. 18, 2020

(51) Int. Cl.
*H04L 29/06* (2006.01)
*H04L 9/08* (2006.01)
(Continued)

(52) U.S. Cl.
CPC ............ *H04L 9/088* (2013.01); *G06F 21/44* (2013.01); *G06K 7/1413* (2013.01); *G06K 7/1417* (2013.01); *H04L 9/30* (2013.01); *H04W 12/04* (2013.01); *H04W 12/06* (2013.01); *H04W 4/80* (2018.02)

(58) Field of Classification Search
CPC .................................................... G06F 21/44
See application file for complete search history.

(56) References Cited

U.S. PATENT DOCUMENTS

| 10,203,968 B1* | 2/2019 | Lawson | G06F 9/44521 |
| 2002/0046336 A1* | 4/2002 | Kon | G06Q 20/3823 713/156 |

(Continued)

OTHER PUBLICATIONS

International Search Report and Written Opinion for International Application No. PCT/US2019/057041 dated Feb. 11, 2020.
(Continued)

*Primary Examiner* — Taghi T Arani
*Assistant Examiner* — Lin Chang
(74) *Attorney, Agent, or Firm* — Yuri Astvatsaturov

(57) ABSTRACT

An apparatus and system for authenticating features for download to an image scanning apparatus has a client computing device generate an image of a symbol that encodes authentication data. The client computing device hashes a communication parameter of its transceiver, digitally signs the hash value with a private key from public-private key pair, and encodes the hash value, digital signature and the unencrypted communication parameter into the symbol. The image scanning apparatus captures an image of the symbol, decodes the symbol, verifies whether the unencrypted communication parameter corresponds to the hash of the communication parameter, and a public key stored in the memory of the barcode reader corresponds with the private key used to sign the hash value. If the communication parameter corresponds with the hash value and the signature corresponds with the public key, the barcode reader enables its transceiver to download the feature from the client computing device.

11 Claims, 5 Drawing Sheets

(51) Int. Cl.
*H04L 9/30* (2006.01)
*H04W 12/04* (2021.01)
*G06F 21/44* (2013.01)
*G06K 7/14* (2006.01)
*H04W 12/06* (2021.01)
*H04W 4/80* (2018.01)

(56) References Cited

U.S. PATENT DOCUMENTS

| | | | | |
|---|---|---|---|---|
| 2003/0016980 A1* | 1/2003 | Meunier | G06K 19/06028 | 400/76 |
| 2004/0215972 A1* | 10/2004 | Sung | H04L 63/1408 | 726/23 |
| 2006/0182133 A1* | 8/2006 | Choumaru | H04L 45/745 | 370/401 |
| 2008/0296384 A1 | 12/2008 | Kotlarsky et al. | | |
| 2011/0081860 A1 | 4/2011 | Brown et al. | | |
| 2011/0283115 A1* | 11/2011 | Junod | H04L 9/0631 | 713/190 |
| 2012/0131350 A1* | 5/2012 | Atherton | H04L 9/3231 | 713/186 |
| 2013/0134212 A1* | 5/2013 | Chang | H04L 67/327 | 235/375 |
| 2013/0259228 A1* | 10/2013 | Ren | H04L 63/123 | 380/200 |
| 2014/0061306 A1 | 3/2014 | Wu et al. | | |
| 2014/0156990 A1* | 6/2014 | Dare | H04L 63/0823 | 713/156 |
| 2014/0325239 A1* | 10/2014 | Ghose | G06F 9/3851 | 713/190 |
| 2015/0186645 A1* | 7/2015 | Aziz | H04L 63/1433 | 726/23 |
| 2015/0207706 A1* | 7/2015 | Li | H04L 67/02 | 709/224 |
| 2015/0256563 A1* | 9/2015 | Le Guen | H04W 76/10 | 709/227 |
| 2015/0350895 A1 | 12/2015 | Brander et al. | | |
| 2017/0046211 A1* | 2/2017 | Jayawardena | G06F 9/45512 | |
| 2018/0004909 A1* | 1/2018 | Cronin | G16H 20/17 | |
| 2018/0338244 A1 | 11/2018 | Singhal et al. | | |
| 2019/0174310 A1* | 6/2019 | Goto | G06K 7/10722 | |
| 2019/0199691 A1* | 6/2019 | Garrett | G06Q 20/3255 | |
| 2020/0043270 A1* | 2/2020 | Cate | G07C 9/00857 | |

OTHER PUBLICATIONS

Culliton. "Barcode Scanner Interface: Connect and Communicate." In: L-Tron. Nov. 7, 2011 (Nov. 7, 2011) Retrieved on Jan. 27, 2020 (Jan. 27, 2020) from <https://www.l-tron.com/barcode-scanner-interface-connect-and-communicate/> entire document.

* cited by examiner

AUTHENTICATION FOR CONNECTING A BARCODE READER TO A CLIENT COMPUTING DEVICE

BACKGROUND OF THE INVENTION

Conventional barcode readers can be updated or configured with applications or other features by scanning a barcode on a client computing device, such as a smartphone, tablet, computer, etc. However, with the availability of software development kits (SDK) for host operating systems, virtually anyone may develop an application for upload to a barcode scanner, including malicious applications. This issue is particularly acute with barcode readers in environments that handle sensitive information, such as hospitals. While other methods are available for authentication, such as a security password or private identification number (PIN), many barcode readers have neither a keypad nor a display. Further, although it is possible that a barcode reader be provided with the media access control (MAC) address of all client computing devices that are authorized to provide applications to the barcode reader, this requires that all barcode scanners in a system, which may be hundreds of barcode scanners, be updated as new client computing devices are introduced or removed, thereby changing the list of MAC addresses.

Accordingly, there is a need for an improved method of authentication for connecting a barcode reader to a client computing device that satisfies both the need to easily establish the connection and maintain security.

SUMMARY

In some embodiments, the present disclosure describes an image scanning apparatus including: a housing having a window; an imaging assembly positioned within the housing, the imaging assembly having an image sensor and a field-of-view (FOV) extending through the window, the image sensor adapted to capture at least one of: light reflected from a symbol and light emitted from the symbol; a first communication transceiver positioned within the housing, the first communication transceiver operable to maintain electronic communication via a communication protocol; a controller operatively coupled to the imaging assembly, the controller having a processor and a memory, wherein the controller is adapted to: decode a symbol captured in an image captured by the image sensor, the symbol comprising encoded data including (i) an unencrypted first communication parameter related to a second communication transceiver on a client computing device, and (ii) a hash of a second communication parameter, wherein (i) the hash of the second communication parameter is signed with a private encryption key, (ii) the symbol is rendered on a display of the client computing device, and (iii) the second communication parameter including identification data uniquely identifying an authorized communication transceiver, validate whether the first communication parameter corresponds with the hash of the second communication parameter, and whether the signature corresponds with a public key stored in the memory, enable the first communication transceiver to establish electronic communication with the second communication transceiver via the communication protocol in response to the first communication parameter corresponding with the hash of the second communication parameter and the signature corresponding with the public key stored in the memory, and download a feature from the client computing device into the memory via the communication protocol in response to enabling the first communication transceiver.

Additionally, in some embodiments, the present disclosure describes a client computing device including: a housing; a display positioned within the housing; a first communication transceiver positioned within the housing, the first communication transceiver operable to maintain electronic communication via a communication protocol; a controller operatively coupled to the first communication transceiver and the display, the controller having a processor and a memory, the controller adapted to: hash a communication parameter related to the first communication transceiver, the communication parameter including identification data uniquely identifying the first communication transceiver; digitally sign the hashed communication parameter using a private encryption key, and generate an image of a symbol on the display, the symbol comprising encoded data including (i) the communication parameter without hashing, (ii) the hashed communication parameter, and (iii) the digital signature of the hashed communication parameter; wherein: the first communication transceiver actively listens for a signal including (i) identification data uniquely identifying the first communication transceiver and (ii) a request to establish a communication link with the first communication transceiver; and responsive to the first communication transceiver receiving the signal, the first communication transceiver and a second communication transceiver establish the communication link, the communication link occurring via the communication protocol.

Additionally, in some embodiments, the present disclosure describes a system including: a client computing device having: a client computing device housing; a display positioned within the client computing device housing; a first communication transceiver positioned within the client computing device housing, the first communication transceiver operable to maintain electronic communication via a communication protocol; a first controller operatively coupled to the first communication transceiver and the display, the first controller adapted to hash a Media Access Control (MAC) address uniquely identifying the first communication transceiver; digitally sign the hashed MAC address using a private encryption key, and generate an image of a symbol on the display that encodes the MAC address without hashing, the hashed MAC address and the digital signature of the hashed MAC address; and a symbol reader having: a symbol reader housing; an imaging assembly positioned at least partially within the symbol reader housing, the imaging assembly having a field of view (FOV), the imaging assembly being configured to capture image data related to a symbol code; a second communication transceiver positioned within the symbol reader housing, the second communication transceiver operable to maintain electronic communication via the communication protocol; and a second controller communicatively coupled to the second communication transceiver, the second controller having a memory and a processor, wherein, responsive to the imaging assembly capturing an image of the symbol: the second controller queries the memory for a public key corresponding to the private key; responsive to the public key not being stored in the memory, the second controller enables the second communication transceiver to establish electronic communication with the first communication transceiver; responsive to establishing electronic communication with the first communication transceiver, the first controller enables the first communication transceiver to transmit the public key corresponding to the private key to the second transceiver; responsive to the public key being stored in the memory, the second controller validates whether the MAC address without hashing corresponds with the hash of the MAC address, and whether the signature corresponds with the public key stored in the memory, responsive to the MAC address without hashing corresponding with the hash of the MAC address and the signature corresponding with the public key stored in the memory, the second controller instructs the second communication transceiver to transmit, via the communication protocol, a signal (i) the MAC address uniquely identifying the first communication transceiver and (ii) a request to establish a communication link with the first communication transceiver; the first communication transceiver actively listens for the signal including (i) the MAC address uniquely identifying the first communication transceiver and (ii) the request to establish the communication link with the first communication transceiver; and responsive to the first communication transceiver receiving the signal, the first communication transceiver and the second communication transceiver establish the communication link, the communication link occurring via the communication protocol; and responsive to establishing the communication link, the second communication transceiver downloads a feature from the client computing device into the memory via the communication protocol.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
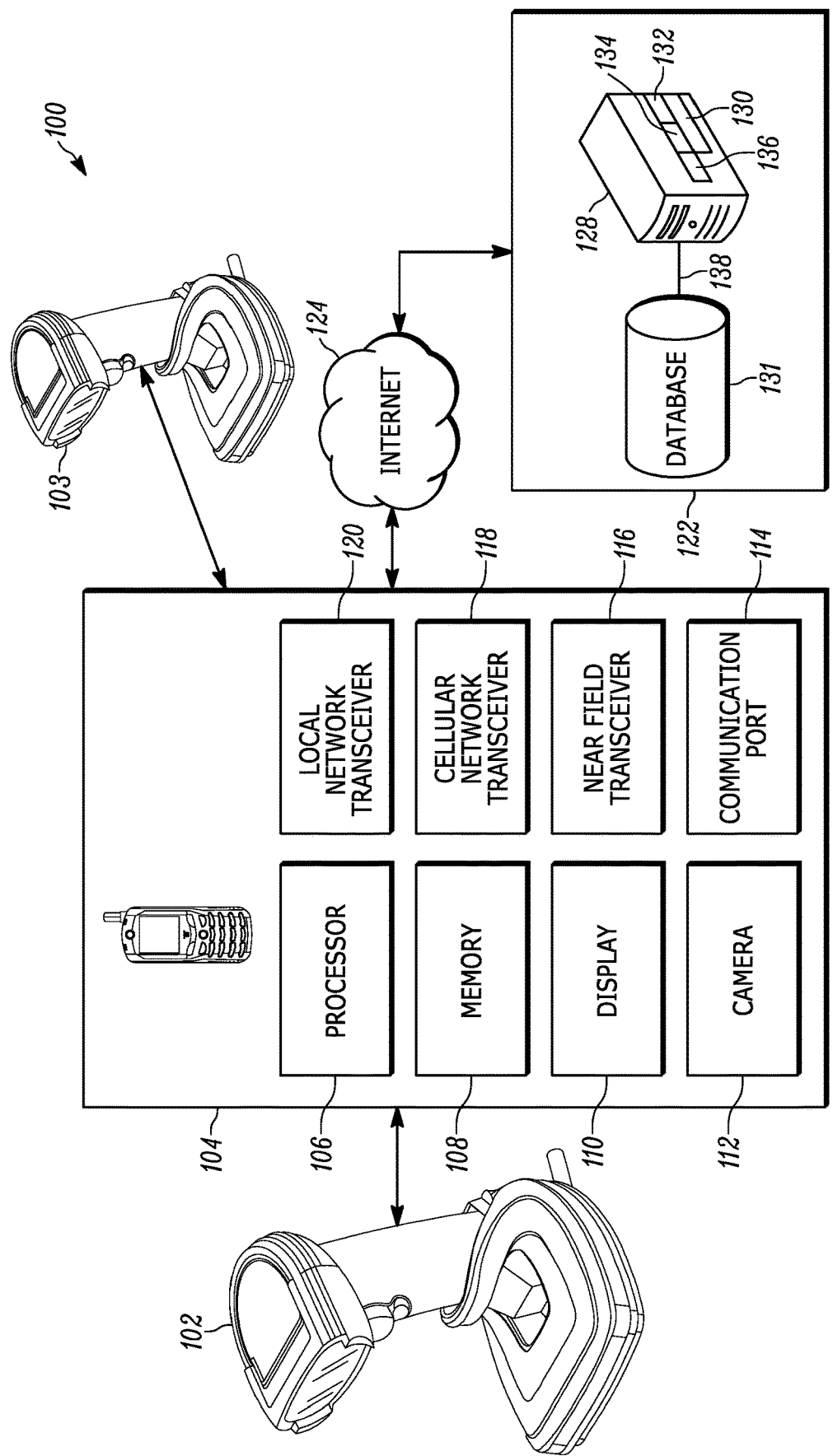
FIG. 1 illustrates a communication system between components according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Referring now to the drawings, FIG. 1 illustrates various aspects of an exemplary architecture implementing a system 100 for uploading features on a barcode reader, including, but not limited to, software applications, software features, configuration settings, firmware updates, etc. More specific examples of the features include, but are not limited to, software for decoding different symbologies (e.g., unique device identification), software for optical character recognition, software for parsing information on a driver's license, and software for reading multiple barcodes on a single surface. The high-level architecture includes both hardware and software applications, as well as various data communications channels for communicating data between the various hardware and software components. The system 100 for uploading features on a barcode reader may include various software and hardware components or modules.

The system 100 for uploading features on a barcode reader includes front end components, including one or more barcode readers 102, 103 and a client computing device 104. The client computing device 104 may include a personal computer, a smart phone, a tablet computer, a smart watch, a head mounted display, a wearable computer or other suitable client computing device. The client computing device 104 includes various components that are operatively coupled to one another, including a controller, which includes microcontroller or a processor 106, a program memory 108, a display 110 and an imaging assembly 112, such as a camera, having an image sensor, all of which are interconnected via an address/data bus (not shown). The processor 106 of the client computing device 104 executes instructions stored in the memory 108 to: 1) generate images on the display 110 and 2) capture images via the imaging assembly 112. It should be appreciated that although FIG. 1 depicts only one processor 106, the controller may include multiple processors 106. Similarly, the memory 108 of the controller may include multiple RAMS and multiple program memories storing one or more corresponding server application modules, according to the controller's particular configuration. The memory 108 may be implemented in a known form of computer storage media, including but not limited to, semiconductor memories, magnetically readable memories, and/or optically readable memories, for example, but does not include transitory media such as carrier waves.

It should be understood from FIG. 1 and the accompanying description that a single client computing device 104 may be used to upload features to multiple barcode readers. As such, although only two barcode readers 102, 103 are depicted, it will be understood that the client computing device 104 may be used to upload features to any number of barcode readers. Further, although only one client computing device is depicted, it will be understood that multiple client computing devices may be used in the system 100 and communicate with the backend components, with each client computing device being assigned to certain ones of the barcode readers or each client computing device capable of uploading features to any of the multiple barcode readers.

The client computing device 104 also includes various communication components, including a hardwire communication port 114, such as a Universal Serial Bus (USB), and/or a wireless nearfield transceiver 116, such as a Bluetooth® transceiver, for communicating with other front end components such as the barcode readers 102, 103. Further, the client computing device 104 includes a cellular network transceiver 118 and/or a local network transceiver 120, such as a WiFi transceiver based on IEEE (Institute of Electrical and Electronics Engineers) 802.11 standards, for communicating with backend components 122 via a public computer network 124. In an embodiment, the processor 106 of the client computing device 104 executes instructions to manage and receive data from the back end components 122 via the computer network 124, such as data for the feature itself to be uploaded to the barcode reader 102.

The computer network 124 may be a network such as the Internet or other type of suitable network (e.g., local area network (LAN), a metropolitan area network (MAN), a wide area network (WAN), a mobile, a wired or wireless network, etc.). The computer network 124 may also be one or more cellular networks such as code division multiple access (CDMA) network, GSM (Global System for Mobile Communications) network, WiMAX (Worldwide Interoperability for Microwave Access) network, Long Term Evolution (LTE) network, etc. The processor 106 of the client computing device 104 may also execute one or more applications to perform the tasks discussed above.

The back end components 122 may include a data server 128 and an account database 131. The back end components 122 may communicate with each other through a communication network 138 such as a local area network or other type of suitable network (e.g., the Internet, a metropolitan area network (MAN), a wide area network (WAN), a mobile, a wired or wireless network, a private network, a virtual private network, etc.).

The system for uploading features on a barcode reader 102, 103 in general, and the data server 128 in particular, includes computer-executable instructions 130. In an embodiment, a processor of the data server 128 executes the instructions 130 to instantiate an access tool 132, a retrieval tool 134 and an analysis tool 136. The access tool 132 receives data from the client computing device 104 and saves the data to one or more databases, such as the account database 131. The retrieval tool 134 retrieves data from the account database 131 or uses an account identifier to access customer account information from the account database 131 relating to licenses for barcode readers owned or leased by the customer, and licensed features for each of the barcode readers. The account database 131 may be a data storage device such as random-access memory (RAM), hard disk drive (HDD), flash memory, flash memory such as a solid state drive (SSD), etc. The analysis tool 136 may perform one or more analyses on the customer account data and/or requests from the client computing device 104 before providing activation data to activate a feature on the barcode reader 102.

Figure 2:
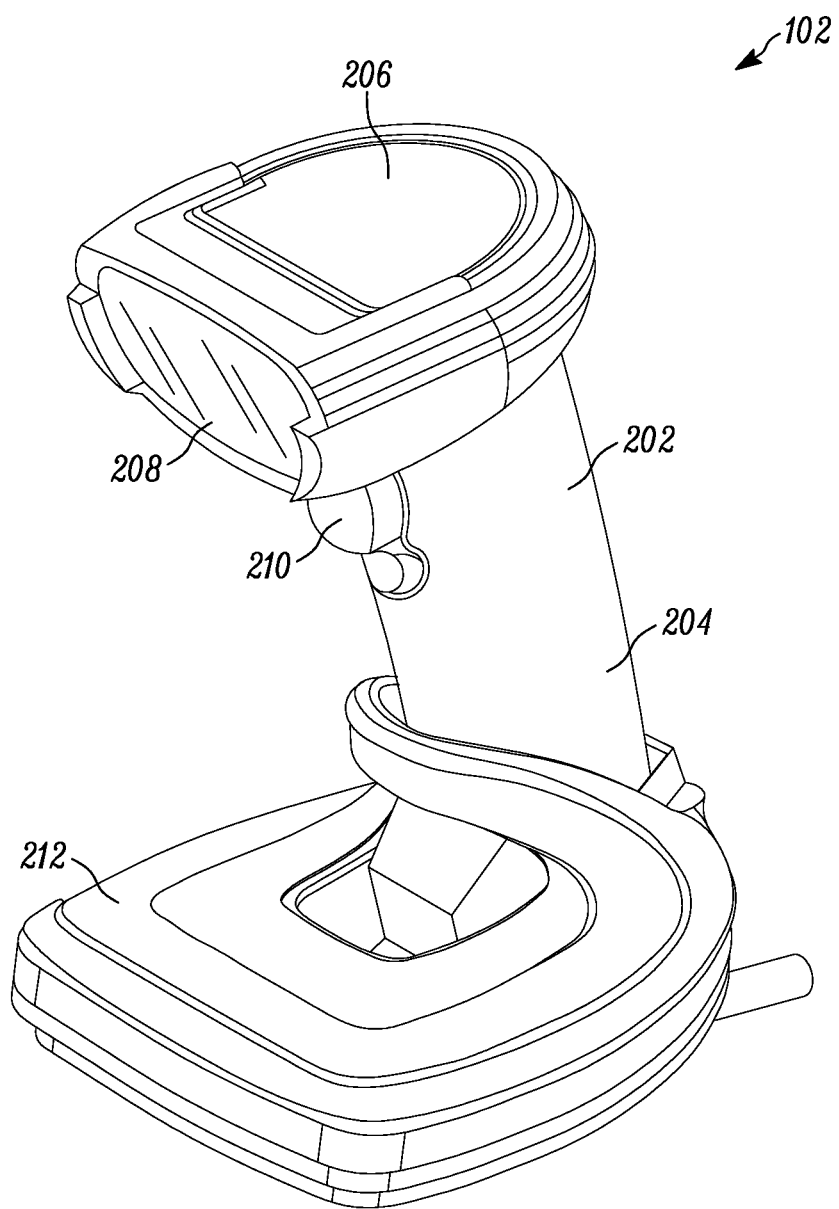
FIG. 2 illustrates a perspective view of a barcode reader of FIG. 1 according to an embodiment of the present invention.

FIG. 2 illustrates an exemplary barcode reader 102 having a housing 202 with a handle portion 204, also referred to as a handle 204, and a head portion 206, also referred to as a scanning head 206. The head portion 206 includes a window 208, and is configured to be positioned on the top of the handle portion 204. The handle portion 204 is configured to be gripped by a reader user (not shown) and includes a trigger 210 for activation by the user. Included in the embodiment is also a base 212 attached to the handle portion 204 opposite the head portion 206. The base 212 is configured to stand on a surface and support the housing 202 in a generally upright position. The barcode reader 102 can be used in a hands-free mode as a stationary workstation when it is placed on the countertop. The barcode reader 102 can also be used in a handheld mode when it is picked up off the countertop and held in an operator's hand. In the hands-free mode, products can be slid, swiped past, or presented to the window 208. In the handheld mode, the barcode reader 102 can be moved towards a barcode on a product, and the trigger 210 can be manually depressed to initiate imaging of the barcode. In some implementations, the base 212 can be omitted, and the housing 202 can also be in other handheld shapes. Other implementations may provide only handheld or only hands-free configurations.

Figure 3:
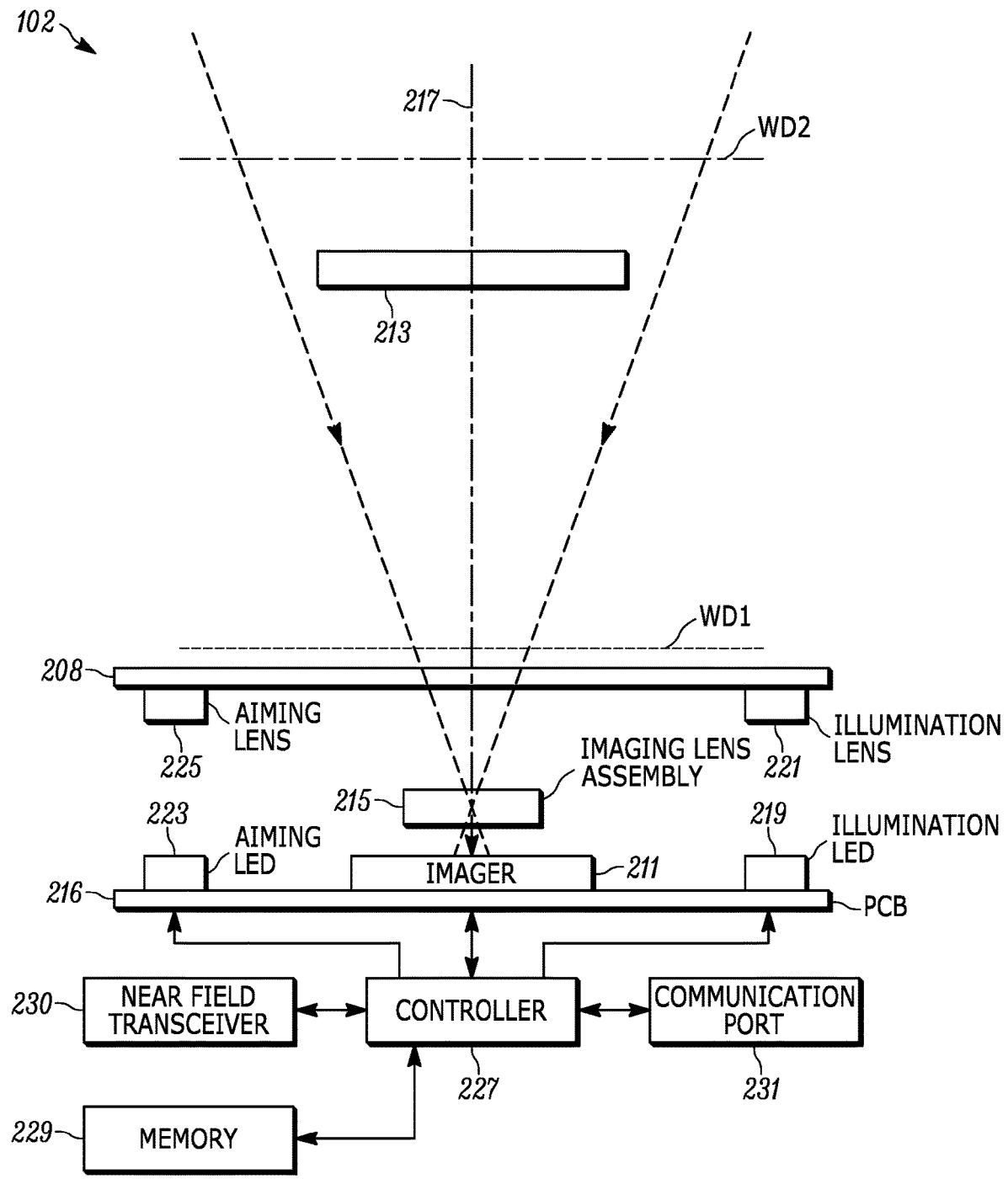
FIG. 3 illustrates a block schematic diagram of some of the components of the barcode reader of FIG. 1 according to an embodiment of the present invention.

FIG. 3 illustrates a block schematic diagram of a portion of a barcode reader 102 in accordance with some embodiments. It should be understood that FIG. 3 is not drawn to scale. Referring to FIG. 3, an imaging assembly includes a light-detecting sensor or image sensor 211 operatively coupled to, or mounted on, a printed circuit board (PCB) 216 in the reader 102. In an embodiment, the image sensor 211 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 215 over a field of view along an imaging axis 217 through the window 208. The return light is scattered and/or reflected from the target 213 over the field of view. The imaging lens assembly 215 is operative for focusing the return light onto the array of image sensors to enable the target 213 to be read. The target 213 may be located anywhere in a working range of distances between a close-in working distance (WD1) and a far-out working distance (WD2). In a preferred embodiment, WD1 is about one-half inch from the window 208, and WD2 is about thirty inches from the window 208.

An illuminating light assembly is also mounted in the imaging reader 102. The illuminating light assembly includes an illumination light source, such as at least one light emitting diode (LED) 219 and at least one illumination lens 221, and preferably a plurality of illumination LEDs and illumination lenses, configured to generate a substantially uniform distributed illumination pattern of illumination light on and along the target 213 to be read by image capture. At least part of the scattered and/or reflected return light is derived from the illumination pattern of light on and along the target 213.

An aiming light assembly is also mounted in the imaging reader 102 and preferably includes an aiming light source 223 (e.g., one or more aiming LEDs), and an aiming lens 225 for generating and directing a visible aiming light beam away from the reader 102 onto the symbol 213. The aiming light beam has a cross-section with a pattern, for example, a generally circular spot or cross-hairs for placement at the center of the symbol 213, or a line for placement across the symbol 213, or a set of framing lines to bound the field of view, to assist an operator in visually locating the symbol 213 within the field of view prior to image capture. The client computing device 104 also includes various communication components, including a wireless nearfield transceiver 230, such as a Bluetooth® transceiver, and/or a hardwire communication port 231 such as a Universal Serial Bus (USB), for communicating with the client computing device 104.

As also shown in FIG. 3, the image sensor 211, the illumination LED 219, the aiming LED 223, the nearfield transceiver 230, and the communication port 231 are operatively connected to a controller or programmed microprocessor 227 operative for controlling the operation of these components. A memory 229 is connected and accessible to the controller 227. Preferably, the microprocessor 227 is the same as the one used for processing the captured return light from the illuminated target 213 to obtain data related to the target 213. More particularly, the microprocessor 227 is the same as the one used to communicate with the client computing device 104, including processing captured return or emitted light from an illuminated target 213 displayed on the display screen of the client computing device to obtain data related to the target 213, as well as communicating with one or more corresponding transceivers of the client computing device 104 via the nearfield transceiver 230 and/or the communication port 231. The disclosure of the barcode reader 102 in FIGS. 2 and 3 are equally applicable to the barcode reader 103 from FIG. 1, and to any other barcode reader within the system 100.

Figure 4:
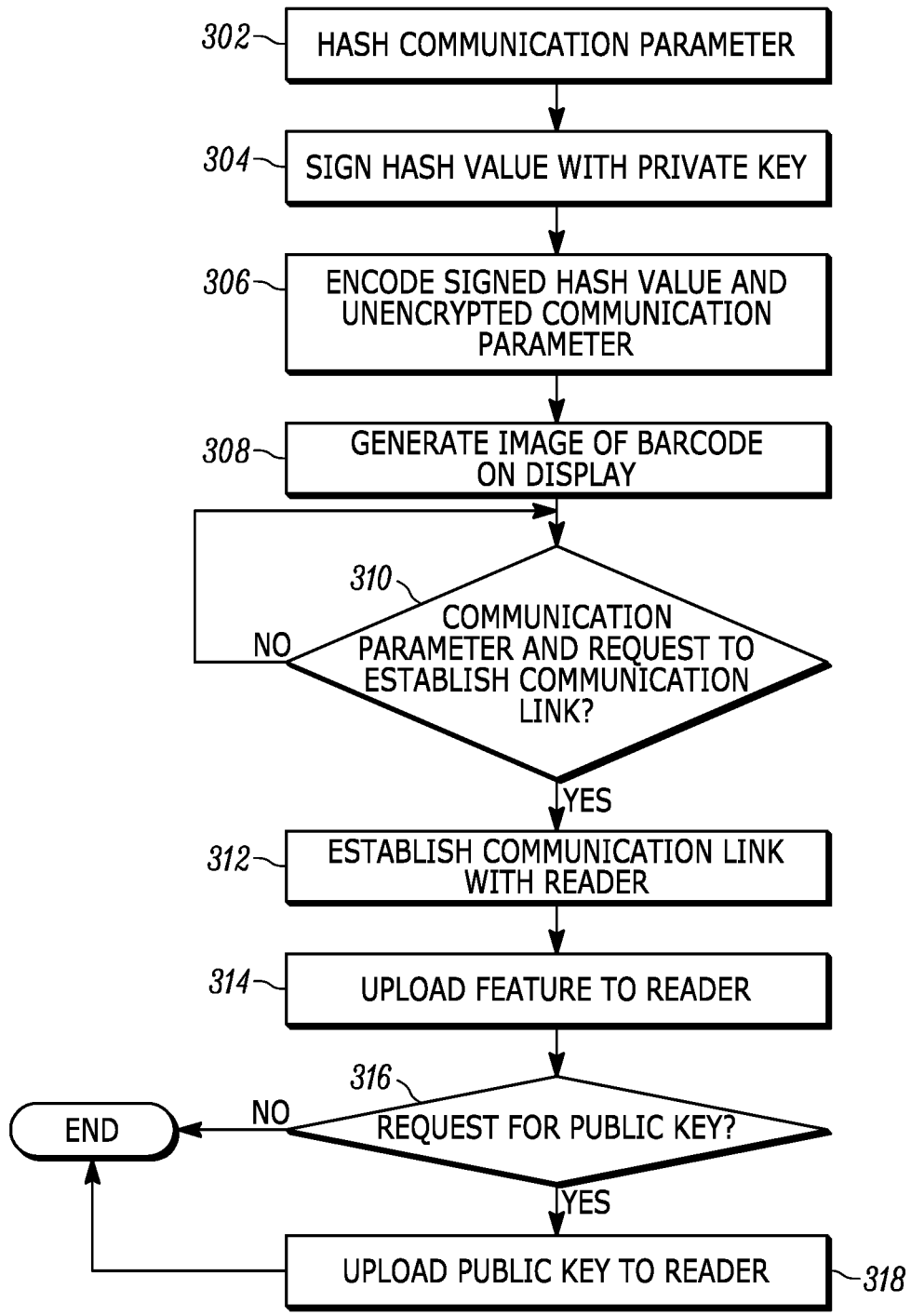
FIG. 4 is a flowchart of a method of authentication for updating features on the barcode reader as executed by the smartphone of FIG. 1 in accordance with some embodiments.

FIG. 4 is a flowchart of the control of the client computing device 104 for authentication prior to establishing a communication link with the barcode reader 102, 103 and uploading features to the barcode reader 102, 103 in the embodiments that have been described herein. The following disclosure makes reference only to the barcode reader 102, though it will be understood that such disclosure is equally applicable to the barcode reader 103 or any other barcode reader in the system 100. Generally speaking, the client computing device 104 generates a pairing barcode that is read by the barcode reader 102 in order to verify that the client computing device 104 is an authorized device from which to download features, such as applications, updates, etc. Once the pairing barcode has been validated and the client computing device 104 validated as an authorized device, the barcode reader 102 and the client computing device 104 establish a communication link via a communication protocol suitable to download the feature from the client computing device 104, such as communication protocols associated with the nearfield transceivers 116, 230 or the communication ports 114, 231 (and corresponding transceivers).

Turning now to the flowchart of FIG. 4, when a feature is to be uploaded to the barcode reader 102, a client computing device 104 authorized to upload features on the barcode reader 102 generates a pairing barcode, an image of which is generated on the display 110 for scanning by the barcode reader 102. Beginning at block 302, when an application or other feature is ready for uploading to the barcode reader 102, the client computing device 104 utilizes a hash function to create a hash value from a communication parameter unique to the transceiver that will be used to upload the feature. For example, if the feature is to be uploaded using near field communication, such as Bluetooth®, the client computing device 104 uses the hash function to create a hash value from the media access control (MAC) address that uniquely identifies the nearfield transceiver 116. When the barcode is generated on the display 110, the barcode will encode the hash value as well as the unencrypted communication parameter (e.g., cleartext MAC address) unique to the transceiver of the client computing device 104 displaying the barcode. Thus, a barcode reader 102 will be able to read the unencrypted communication parameter from the barcode and determine whether or not it has been tampered with by comparing its hash value to the hash value encoded in the barcode. If even a small part of the communication parameter is different than that used to create the hash value, the communication parameter is considered invalid. For example, the barcode reader 102 may only accept uploads from authorized client computing devices, each of which is identified by its MAC address. If an unauthorized client computing device attempts to "spoof" a MAC address of an authorized client computing device, the hash value of the MAC address of an authorized client computing device (which is known by the barcode reader 102) will not correspond to the hash value of the spoofed MAC address. As another example, the barcode reader 102 compares the cleartext MAC address encoded in the barcode with the hash value encoded in the barcode to verify that the MAC address has not been tampered with.

In addition to creating the hash value from the communication parameter unique to the transceiver of the client computing device, the client computing device uses a signing algorithm to digitally sign the hash value at block 304. In particular, an authorized client computing device utilizes asymmetric encryption using private-public key pairs, where an authorized client computing device distributes the public key to the barcode readers, and maintains the corresponding private key. A barcode reader is thus able to accept or reject the authenticity of the barcode displayed on a client computing device using its corresponding public key. In an embodiment, the private key is used to digitally sign not only the hash value, but also the unencrypted communication parameter (e.g., cleartext MAC address).

At block 306, the client computing device encodes the digitally signed hash value and the unencrypted communication parameter (whether digitally signed or unsigned) into a barcode symbol. In an embodiment, the barcode symbol is a two-dimensional or three-dimensional barcode symbol, which allows for more information to be encoded than a one-dimensional barcode allows. Considering that a digital signature tends to be rather large, it is preferred that a two- or three-dimensional barcode symbol is utilized. A graphic or image of the barcode symbol is then generated by the client computing device on the display 110 at block 308 for scanning by the barcode reader 102. In an embodiment, the image of the barcode symbol may only be generated upon a prompt by a user of the client computing device when ready to upload the feature to the barcode reader 102.

Thereafter, the client computing device, and, more particularly, the short-range communication transceiver for uploading the feature (e.g., the transceiver for the communication port 114 or the nearfield transceiver 116) actively listens for a signal from a barcode reader that has scanned the barcode symbol generated on the display 110 of the client computing device 104 at block 310. In an embodiment, the signal includes the communication parameter (e.g., MAC address) of the client computing device from the barcode symbol along with a request to establish a communication link between the transceiver of the client computing device and a corresponding transceiver of the barcode reader 102. In response to receiving the signal, the short-range communication transceiver of the client computing device and the short-range transceiver of the barcode reader establish a communication link (e.g., a bi-directional communication link) using the short-range communication protocol of the transceivers (e.g., Bluetooth®). Once the signal is received by the client computing device, the client computing device establishes the communication link with the barcode reader at block 312, and at block 314 uploads the feature to the barcode reader.

In some instances, the barcode reader has not yet been provided with a public key, such as when the barcode reader is first being activated within the system 100. In such cases, as will be described further below, the client computing device may receive a request from the barcode reader for a public key at block 316. Provided that a private key has already been generated and resides on the client computing device (along with corresponding public keys), the client computing device transmits the public key to the barcode reader at block 318, which will be used to authenticate the private key signature of barcodes associated with any further downloads of features from a client computing device.

Figure 5:
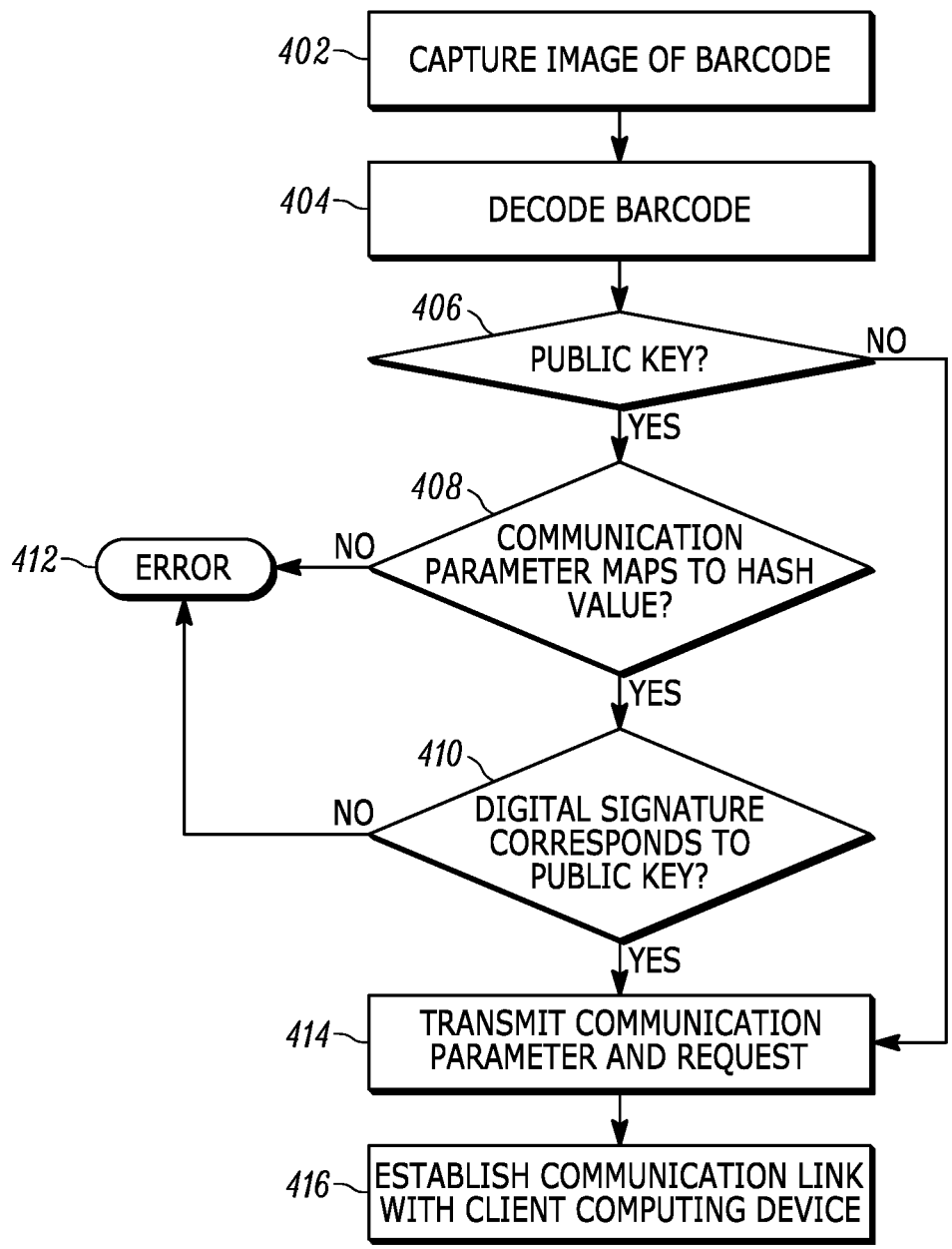
FIG. 5 is a flowchart of a method of authentication for updating features on the barcode reader as executed by the barcode reader of FIG. 1 in accordance with some embodiments.

FIG. 5 is a flowchart of the control of the barcode reader 102 for downloading features to the barcode reader 102 in the embodiments that have been described herein. Turning now to the flowchart of FIG. 5, when the client computing device 104 generates an image of the symbol encoding the authentication data including the communication parameter, the hash value of the communication parameter, and the private key signature on the display 110, the image sensor 211 of the barcode reader 102 captures an image of the symbol at block 402. The target 213 for the barcode reader 102 in this instance is the symbol displayed on the client computing device 104. The aiming LED 223 is activated such that the barcode reader 102 may be aimed at the target 213, and the illumination LED 219 is activated to illuminate the target 213. The image sensor 211 then captures an image of the target 213.

At block 404, the controller 227 utilizes a decode algorithm stored in the memory 229 corresponding to the symbology type of the symbol displayed on the client computing device 104 to decode the image of the symbol as captured by the image sensor 211. In particular, the image of the symbol is decoded so as to decode the authentication data encoded within the symbol. As mentioned above, the authentication data, once decoded, includes the communication parameter uniquely identifying the transceiver of the client computing device for downloading the feature (e.g., MAC address of the Bluetooth® transceiver), the hash value from hashing the communication parameter, and the signature created with the private key.

As an initial matter, the controller 227 checks its memory 229 to see whether the barcode reader 102 has been provided with a public key with which to check the authenticity of the signature at block 406. If the public key is stored in the memory 229, the controller 227 proceeds to authenticate the authentication data encoded in the symbol at block 408. On the other hand, if the public key does not reside in the memory 229, the controller 227 may bypass the authentication process and establish a communication link with the client computing device 104 at block 414, at which point it may generate and transmit an indication to the client computing device 104 via the nearfield transceiver 116 or communication port 114 using the unencrypted communication parameter as provided in the symbol. Such an instance may arise when the barcode reader 102 is first commissioned by a customer for introduction into the system 100. The indication is provided as a prompt for the client communication device 104 to generate the public/private key pair and/or transmit the public key corresponding to its private key to the barcode reader 102. In an embodiment, the client communication device 104 has a key generation algorithm stored within its memory 108 and executed by its processor 106 to generate a random private key and a corresponding public key. Once the barcode reader 102 has been provided with the public key, the barcode reader 102 stores the public key in a persistent memory (which may be the memory 229, a partition of the memory 229 or a separate memory) so that future downloads from a client computing device are authenticated using the public key, even after a reset of the barcode reader 102 to factory settings.

Referring back to block 408, the controller 227 verifies that the communication parameter unique to the transceiver of the client computing device 104 as encoded in the symbol corresponds to the hash value encoded in the symbol. For example, the barcode reader 102 maps the unencrypted communication parameter to its hash value, and determines whether the mapped hash value is the same as that encoded in the symbol. As mentioned above, a communication parameter, such as a MAC address, that has been compromised results in a different hash value than that provided in the symbol. Thus, the barcode reader 102 verifies that the client computing device is an authorized client computing device from which to download a feature, and that the feature is authorized to be downloaded to the barcode reader 102.

At block 410, the controller 227 verifies that the digital signature of the authentication data was made with a private key that corresponds to the public key stored in the memory 229. For example, the controller 227 may execute a signature verifying algorithm that, given the authentication data, public key and signature, either accepts or rejects the authenticity of the authentication data. If either of the authentication steps at blocks 408, 410 fail, the controller 227 may output an error at block 412, which may correspond with a visual or audio signal that the symbol has not been authenticated. The error at block 412 results in the controller 102 preventing the nearfield transceiver 230 and/or the communication port 231 from establishing a communication link with the corresponding transceiver of the client computing device 104. On the other hand, if the authentication process at blocks 408, 410 is successful, the controller 227 enables the transceiver corresponding to the transceiver of the unencrypted communication parameter encoded in the symbol, and the barcode reader 102 downloads the feature from the client computing device 104 via the nearfield transceiver 230 or the communication port 231 if connected via hardwire communication (e.g., USB cable). Once the feature has been downloaded to the barcode reader 102, the controller 227 installs and enables the feature in the memory 229. Thereafter, the barcode reader 102 is able to utilize the feature.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. An image scanning apparatus comprising:
a housing having a window;
an imaging assembly positioned within the housing, the imaging assembly having an image sensor and a field-of-view (FOV) extending through the window, the image sensor adapted to capture at least one of: light reflected from a target and light emitted from the target;
a first communication transceiver positioned within the housing, the first communication transceiver operable to maintain electronic communication via a communication protocol;
a controller operatively coupled to the imaging assembly, the controller having a processor and a memory, wherein the controller is adapted to:
decode a symbol in an image captured by the image sensor, the symbol comprising encoded data including (i) an unencrypted first communication parameter related to a second communication transceiver on a client computing device, and (ii) a hash of a second communication parameter, wherein (i) the hash of the second communication parameter is signed with a private encryption key, (ii) the symbol is rendered on a display of the client computing device, and (iii) the second communication parameter including identification data uniquely identifying an authorized communication transceiver,
validate whether the first communication parameter corresponds with the hash of the second communication parameter, and whether the signature corresponds with a public key stored in the memory,
enable the first communication transceiver to establish electronic communication with the second communication transceiver via the communication protocol in response to the first communication parameter corresponding with the hash of the second communication parameter and the signature corresponding with the public key stored in the memory, and
download a feature from the client computing device into the memory via the communication protocol in response to enabling the first communication transceiver,
wherein the first communication parameter comprises a Media Access Control (MAC) address uniquely identifying the second communication transceiver, and the second communication parameter comprises a MAC address uniquely identifying an authorized communication transceiver.

2. The image scanning apparatus of claim 1, wherein responsive to the first communication parameter corresponding with the hash of the second communication parameter and the signature corresponding with the public key stored in the memory, the controller instructs the first communication transceiver to transmit, via the communication protocol, a signal including (i) identification data uniquely identifying the first transceiver and (ii) a request to establish a communication link with the second communication transceiver.

3. The image scanning apparatus of claim 1, wherein the first and second communication transceivers each comprise a short-range wireless communication transceiver, and wherein the communication protocol comprises a short-range wireless communication protocol.

4. The image scanning apparatus of claim 1, wherein the symbol comprises at least one of: (i) a two-dimensional barcode, and (ii) a three-dimensional barcode.

5. The image scanning apparatus of claim 1, wherein the controller is further adapted to:

query the memory for the public key;
enable the first communication transceiver to establish electronic communication with the second communication transceiver via the communication protocol in response to the public key not being stored in the memory; and
validate whether the first communication parameter corresponds with the hash of the second communication parameter, and whether the signature corresponds with the public key stored in the memory in response to the public key being stored in memory.

6. The image scanning apparatus of claim 5, wherein the memory comprises a persistent memory, and wherein the controller is further adapted to download the public key from the client computing device into the persistent memory via the communication protocol in response to the public key not being stored in the persistent memory.

7. A system comprising:
a client computing device having:
a client computing device housing;
a display positioned within the client computing device housing;
a first communication transceiver positioned within the client computing device housing, the first communication transceiver operable to maintain electronic communication via a communication protocol;
a first controller operatively coupled to the first communication transceiver and the display, the first controller adapted to hash a Media Access Control (MAC) address uniquely identifying the first communication transceiver; digitally sign the hashed MAC address using a private encryption key, and generate an image of a symbol on the display that encodes the MAC address without hashing, the hashed MAC address and the digital signature of the hashed MAC address; and
a symbol reader having:
a symbol reader housing;
an imaging assembly positioned at least partially within the symbol reader housing, the imaging assembly having a field of view (FOV), the imaging assembly being configured to capture image data related to a symbol code;
a second communication transceiver positioned within the symbol reader housing, the second communication transceiver operable to maintain electronic communication via the communication protocol; and
a second controller communicatively coupled to the second communication transceiver, the second controller having a memory and a processor,
wherein, responsive to the imaging assembly capturing an image of the symbol:
the second controller queries the memory for a public key corresponding to the private encryption key;
responsive to the public key not being stored in the memory, the second controller enables the second communication transceiver to establish electronic communication with the first communication transceiver;
responsive to establishing electronic communication with the first communication transceiver, the first controller enables the first communication transceiver to transmit the public key corresponding to the private encryption key to the second transceiver;
responsive to the public key being stored in the memory, the second controller validates whether the MAC address without hashing corresponds with the hash of the MAC address, and whether the signature corresponds with the public key stored in the memory,
responsive to the MAC address without hashing corresponding with the hash of the MAC address and the signature corresponding with the public key stored in the memory, the second controller instructs the second communication transceiver to transmit, via the communication protocol, a signal (i) the MAC address uniquely identifying the first communication transceiver and (ii) a request to establish a communication link with the first communication transceiver;
the first communication transceiver actively listens for the signal including (i) the MAC address uniquely identifying the first communication transceiver and (ii) the request to establish the communication link with the first communication transceiver; and
responsive to the first communication transceiver receiving the signal, the first communication transceiver and the second communication transceiver establish the communication link, the communication link occurring via the communication protocol; and
responsive to establishing the communication link, the second communication transceiver downloads a feature from the client computing device into the memory via the communication protocol.

8. The system of claim 7, wherein the symbol reader comprises a first symbol reader, the system further comprising, a second symbol reader, the second symbol reader having:
a second symbol reader housing;
a second imaging assembly positioned at least partially within the second symbol reader housing, the second imaging assembly having a field of view (FOV), the second imaging assembly being configured to capture image data related to a symbol code;
a third communication transceiver positioned within the second symbol reader housing, the third communication transceiver operable to maintain electronic communication via the communication protocol; and
a third controller communicatively coupled communicatively coupled to the second communication transceiver, the third controller having a second memory and a second processor,
wherein, responsive to the second imaging assembly capturing an image of the symbol:
the third controller queries the second memory for the public key corresponding to the private encryption key;
responsive to the public key not being stored in the second memory, the third controller enables the third communication transceiver to establish electronic communication with the first communication transceiver;
responsive to establishing electronic communication with the first communication transceiver, the first controller enables the first communication transceiver to transmit the public key corresponding to the private encryption key to the third communication transceiver;
responsive to the public key being stored in the second memory, the third controller validates whether the MAC address without hashing corresponds with the hash of the MAC address, and whether the signature corresponds with the public key stored in the second memory, responsive to the MAC address without hashing corresponding with the hash of the MAC address and the signature corresponding with the public key stored in the second memory, the third controller instructs the third communication transceiver to transmit, via the communication protocol, a signal (i) the MAC address uniquely identifying the first communication transceiver and (ii) a request to establish a communication link with the first communication transceiver;

the first communication transceiver actively listens for the signal including (i) the MAC address uniquely identifying the first communication transceiver and (ii) the request to establish the communication link with the first communication transceiver; and responsive to the first communication transceiver receiving the signal, the first communication transceiver and the third communication transceiver establish the communication link, the communication link occurring via the communication protocol; and responsive to establishing the second communication link, the third communication transceiver downloads a feature from the client computing device into the second memory via the communication protocol.

9. The system of claim 8, wherein the first and second communication transceivers each comprise a short-range wireless communication transceiver, and wherein the communication protocol comprises a short-range wireless communication protocol.

10. The system of claim 8, wherein the symbol comprises at least one of: (i) a two-dimensional barcode, and (ii) a three-dimensional barcode.

11. The system of claim 8, wherein the memory comprises a persistent memory, and wherein the second controller is further adapted to download the public key from the client computing device into the persistent memory via the communication protocol in response to the public key not being stored in the persistent memory.

* * * * *